(12) United States Patent
Rabbino

(10) Patent No.: US 9,321,518 B1
(45) Date of Patent: Apr. 26, 2016

(54) VERTICALLY STABLE AERIAL PLATFORM

(71) Applicant: Peter Rabbino, Miami, FL (US)

(72) Inventor: Peter Rabbino, Miami, FL (US)

(*) Notice: Subject to any disclaimer, the term of this patent is extended or adjusted under 35 U.S.C. 154(b) by 189 days.

(21) Appl. No.: 14/270,605

(22) Filed: May 6, 2014

(51) Int. Cl.
*B64B 1/50* (2006.01)
*B64B 1/42* (2006.01)
*B64B 1/66* (2006.01)

(52) U.S. Cl.
CPC ... *B64B 1/50* (2013.01); *B64B 1/42* (2013.01); *B64B 1/66* (2013.01)

(58) Field of Classification Search
CPC .............. B64B 1/42; B64B 1/50; B64B 1/66; B64B 39/022; F05B 2240/921; F05B 2240/922
See application file for complete search history.

(56) References Cited

U.S. PATENT DOCUMENTS

| | | | |
|---|---|---|---|
| 4,285,481 A | 8/1981 | Biscomb | |
| 4,350,897 A * | 9/1982 | Benoit | F03D 9/00 244/33 |
| 4,350,898 A * | 9/1982 | Benoit | F03D 9/00 244/33 |
| 4,486,669 A | 12/1984 | Pugh | |
| 4,491,739 A | 1/1985 | Watson | |
| 6,781,254 B2 | 8/2004 | Roberts | |
| 7,317,261 B2 | 1/2008 | Rolt | |
| 8,253,265 B2 | 8/2012 | Glass | |
| 8,350,403 B2 | 1/2013 | Carroll | |
| 9,000,605 B2 * | 4/2015 | Glass | F03D 1/04 244/30 |
| 2008/0048453 A1 | 2/2008 | Amick | |
| 2010/0026007 A1 | 2/2010 | Bevirt | |
| 2011/0101692 A1 * | 5/2011 | Bilaniuk | B64B 1/10 290/44 |
| 2013/0307274 A1 | 11/2013 | Sia | |

FOREIGN PATENT DOCUMENTS

WO    WO2008004261 A1    1/2008

* cited by examiner

*Primary Examiner* — Philip J Bonzell
(74) *Attorney, Agent, or Firm* — Albert Bordas, P.A.

(57) ABSTRACT

A vertically stable aerial platform having an envelope assembly with an envelope having an edge and a base. The envelope is an aerodynamically shaped inflatable housing filled with lighter-than-air gas, whereby the envelope is substantially convex and the base is substantially flat. The lighter-than-air gas within the envelope provides lift. Further having a base frame assembly, a tail assembly, and a ground station. The ground station has a winch assembly, an electrical system, and an electrically conducted tether. The electrically conducted tether is wound onto the winch assembly to raise or lower the aerial platform to a desired predetermined altitude having ideal wind conditions at any given time. Further having a mounting post to mount a wind turbine assembly, camera equipment, communication system antennas, and/or equipment thereon.

18 Claims, 6 Drawing Sheets

VERTICALLY STABLE AERIAL PLATFORM

BACKGROUND OF THE INVENTION

1. Field of the Invention

The present invention relates to aerial platforms, and more particularly, to vertically stable aerial platforms elevated to predetermined altitudes for multiple uses including harnessing wind energy, and/or elevating equipment such as cameras, and/or communication system antennas.

2. Description of the Related Art

Applicant believes that one of the closest references corresponds to U.S. Patent Application Publication No. 20130307274 A1, published on Nov. 21, 2013 to Sia for Power Generating Windbags and Waterbags. However, it differs from the present invention because Sia teaches a method of using a bagged power generation system comprising windbags and water-bags for harnessing wind and water power to produce electricity. Windbags integrated with aerodynamically shaped inflatable bodies are filled with lighter-than-air gas: HAV, UAV, airplanes; that enable the apparatus to attain high altitudes to capture and entrap high velocity wind. Water-bags integrated with hydrodynamic shaped bodies: HUV, UUV, Submarine-boats; enable the apparatus to dive, capture and entrap swift moving tidal-currents. Attached tether-lines pulling on rotating reel-drums and generators produce electricity. Active control surfaces, turbo-fans, and propellers provide control of the apparatus. A system configured to maximize fluids capture, retain, and optimize extraction of its kinetic energy.

Applicant believes that another reference corresponds to U.S. Patent Application Publication No. 20100026007 A1, published on Feb. 4, 2010 to Bevirt for Apparatus and Method for Harvesting Wind Power Using Tethered Airfoil. However, it differs from the present invention because Bevirt teaches a wind energy generator for employment in a jet stream or other wind conditions. The craft comprises a "kite" configured with an airfoil tethered to a ground based power generator. The craft and tether are configured to pull on the tether during a flight pattern calculated to pull on the tether that is connected to the generator to enable power generation. Also, an aerodynamically stable tether configuration is used and can be supplemented with a number of periodically spaced control surfaces arranged at various points along the tether. These control surfaces can be selectively actuated to stabilize and position the tether. The tether can comprise a two-stage tether having an inelastic portion attached to a pool and an elastic portion that connects with the kite. Also, wind detection devices identify local wind variations, and through control systems, enable positioning of the kite.

Applicant believes that another reference corresponds to U.S. Patent Application Publication No. 20080048453 A1, published on Feb. 28, 2008 to Amick for Tethered Wind Turbine. However, it differs from the present invention because Amick teaches a tethered wind turbine that uses an aerodynamic, flow-concentrating shape and lighter-than-air construction utilizing a lifting gas and an electrically conductive tether fixed to ground to reap energy from the wind at low or high altitude. The tethered wind turbine floats aloft downwind to a direction and position that is aligned with the wind. Sensors and control modules are used to fly gracefully at an optimal altitude in most wind regimes and also to ascend/descend when appropriate to seek shelter from extreme weather conditions. The tethered wind turbine utilizes carbon nanotube materials in its tether for both structural and conductive purposes. A ring-wing section profile in a preferred embodiment has a very low coefficient of drag.

Applicant believes that another reference corresponds to U.S. Pat. No. 8,350,403 B2 issued to Carroll on Jan. 8, 2013 for Tether Handling for Airborne Electricity Generators. However, it differs from the present invention because Carroll teaches a power generation system including an airborne electricity generator, a tether assembly configured to carry electricity from the generator to land, the tether assembly having a first end portion coupled to the generator, and a winch assembly configured to reel the tether assembly onto a drum, wherein the winch assembly is configured to apply a reel tension to the tether assembly reeled onto the drum that is lower than a tension in the first end portion of the tether assembly.

Applicant believes that another reference corresponds to U.S. Pat. No. 8,253,265 B2 issued to Glass on Aug. 28, 2012 for Power-augmenting Shroud for Energy-Producing Turbines. However, it differs from the present invention because Glass teaches a shroud, such as for an airborne wind-turbine for converting wind energy into another form of energy, such as electrical energy. The shroud has a ring-like shape with an airfoil cross-section and defines an interior volume for containing a lighter-than-air gas. The shroud includes a central opening oriented along a longitudinal axis of the shroud. The shroud is configured to produce an asymmetric moment of left and right lateral sections thereof, which asymmetric moment yields a restoring moment that automatically orients the longitudinal axis of the shroud substantially optimally relative to a prevailing wind direction.

Applicant believes that another reference corresponds to U.S. Pat. No. 7,317,261 B2 issued to Rolt on Jan. 8, 2008 for Power Generating Apparatus. However, it differs from the present invention because Rolt teaches a Power generating apparatus including a cable, which rotatably mounts a plurality of power units. The power units include wind power turbines for producing power from the wind as the plurality of power units fly in the sky whilst connected to the cable.

Applicant believes that another reference corresponds to U.S. Pat. No. 6,781,254 B2 issued to Roberts on Aug. 24, 2004 for Windmill Kite. However, it differs from the present invention because Roberts teaches a kite having a flying platform including a plurality of mill rotors, at least one tethering line maintaining the platform at a substantially fixed geographical location, at least one dynamo on the platform drive connected to the mill rotors, and a conductor connecting the dynamo to an electrical transmission and supply system at ground level. The windmill kite has at least three substantially axially co-directed, spaced apart mill rotors disposed in an array which is symmetrical in terms of thrust capacity about each of two orthogonal axes extending from the platform and being neutral in terms of torque capacity about a third orthogonal axes extending from the platform.

Applicant believes that another reference corresponds to U.S. Pat. No. 4,491,739 A issued to Watson on Jan. 1, 1985 for Airship-Floated Wind Turbine. However, it differs from the present invention because Watson teaches a wind turbine, by use of a tethered airship for support, designed for the recovery of power at heights of 2,000 feet or more above ground, at which height power density in the wind is typically three times the power density available to a conventionally supported wind turbine. Means can be added to such an airship-floated wind turbine, which will permit its generators to be used to meet load demand even during periods of little or no wind.

Applicant believes that another reference corresponds to U.S. Pat. No. 4,486,669 A issued to Pugh on Dec. 4, 1984 for Wind Generator Kite System. However, it differs from the present invention because Pugh teaches a system for generating electrical energy by wind power. The wind generator is suspended in the air like a kite by wind currents and is attached to the earth by a high strength cable to which are attached electric cables and a natural gas pipe. Numerous small wind generators are mounted in a box-like kite enclosure, which are raised to the desired elevation by rotary blade power with the assistance of a gas balloon. The wind generator kite is raised and lowered to the proper elevation for maximum electrical output. A complete system, including control methods, permits the production of electricity and provides means for generating power with a load factor.

Applicant believes that another reference corresponds to U.S. Pat. No. 4,350,897 A issued to Benoit on Sep. 21, 1982 for Lighter Than Air Wind Energy Conversion System. However, it differs from the present invention because Benoit teaches a lighter-than-air (LTA) wind energy conversion system (WECS) wherein a LTA envelope carries a main rotor and electrical generator to take advantage of high wind speeds available at high altitudes. The LTA envelope is tethered to a ground based mooring system designed to provide self-orientation for the LTA envelope. In a preferred embodiment, heavy mechanical transmissions are eliminated by providing a hollow bladed main rotor, which drives an induction turbine positioned within a substantially linear duct, which is, in turn, preferably located along the longitudinal axis of the LTA envelope. The output of the induction turbine is coupled to an electrical generator whose output is, in turn, transmitted to the ground via the tethering system.

Applicant believes that another reference corresponds to U.S. Pat. No. 4,285,481 A issued to Biscomb on Aug. 25, 1981 for Multiple Wind Turbine Tethered Airfoil Wind Energy Conversion System. However, it differs from the present invention because Biscomb teaches a plurality of wind turbines supported aloft on a same tethered airfoil, which is provided with devices for orienting wind turbines into wind.

Applicant believes that another reference corresponds to PCT Publication No. WO 2008004261 A1 published on Jan. 10, 2008 to Ippolito, et al. for Wind System for Converting Energy Through a Vertical-Axis Turbine Actuated by Means of Kites and Process for Producing Electric Energy Through Such System. However, it differs from the present invention because Ippolito, et al. teaches a system for converting wind energy, comprising at least one kite that can be driven from the ground immersed in at least one wind current and a vertical-axis wind turbine, placed at, ground level, such wind turbine being equipped with at least one arm connected through two ropes to the kite. The kite being adapted to be driven through the turbine to rotate the arm and convert wind energy into electric energy through at least one generator/motor system operating as generator that co-operates with the turbine. The ropes being adapted both to transmit mechanical energy from and to the kites, and to control the flight trajectory of the kites. A process for producing electric energy through such system is further described.

Furthermore, kites, balloons, and kytoons have difficulty in capturing energy at specific altitudes over a specific designated area, whereby wind blows the kites and balloons down range. Consequently, more aerial space is needed, which translates to greater weight for a longer electrically conductive cable. Thus, requiring more lift. The challenge with an exclusive wing/kite design is that substantial wind energy is needed to launch wind turbines and to keep them aloft.

Other art describing the closest subject matter provides for a number of more or less complicated features that fail to solve the problem in an efficient and economical way. None of this art suggests the novel features of the present invention.

SUMMARY OF THE INVENTION

The present invention is a vertically stable aerial platform that is elevated to predetermined altitudes for multiple uses including harnessing wind energy; and/or elevating equipment such as cameras, and/or communication system antennas.

More specifically, the present invention is an aerial platform, comprising an envelope assembly comprising an envelope having an edge and a base. The envelope is an aerodynamically shaped inflatable housing filled with lighter-than-air gas, whereby the envelope is substantially convex and the base is substantially flat. The lighter-than-air gas within the envelope provides lift. The present invention further comprises a base frame assembly, a tail assembly, and a ground station. In a preferred embodiment, the lighter-than-air gas is helium.

The envelope assembly is mounted onto the base frame assembly, whereby the base frame assembly comprises first and second sidewalls that extend longitudinally from a front end to a rear end of the edge. The first and second sidewalls have respective forward edges and respective bottom edges, and terminate at a rear wall. The base frame assembly further comprises forward lip sections that extend from the respective forward edges, partially overcoming the front end of the edge. The base frame assembly further comprises rear lip sections that extend from a housing, partially overcoming the rear end of the edge, whereby the housing is defined between the rear lip sections and the rear wall.

Anti-rolling means minimize rolling about a longitudinal axis, whereby a central vertical stabilizer and at least two lateral vertical stabilizers protrude vertically from the envelope and away from the base.

Extending from the base frame assembly is a tail assembly connecting bar. The tail assembly connecting bar comprises first and second connecting bars. The first connecting bar is fixedly mounted to the housing and is aligned with the base and the base frame assembly. The second connecting bar is at an angle with respect to the first connecting bar. When at a desired predetermined pitch, the second connecting bar is in a horizontal position while the aerial platform is aloft.

Anti-yawing means to minimize yawing about a vertical axis, whereby the tail assembly extends from the second connecting bar. The tail assembly comprises a vertical fin and horizontal stabilizers. The horizontal stabilizers align with the second connecting bar and therefore are kept in a fixed horizontal orientation. The horizontal orientation of the horizontal stabilizers assist to keep the central vertical stabilizer and the at least two lateral vertical stabilizers at an optimal pitch/angle.

Pitching means maintain a predetermined pitch about a lateral axis, whereby the pitching means comprises an accelerometer to calculate pitch of the aerial platform and cause to maintain an optimal predetermined pitch. The pitching means enables the aerial platform to launch and stay aloft in minimal wind speed conditions, and remain vertically oriented generally above its respective launch site regardless of changes in force or direction of wind.

The ground station comprises a winch assembly, an electrical system, and an electrically conducted tether. The electrically conducted tether is wound onto the winch assembly to raise or lower the aerial platform to a desired predetermined altitude having ideal wind conditions at any given time.

Further comprising a mounting post to mount a wind turbine assembly, camera equipment, communication system antennas, and/or equipment thereon.

It is therefore one of the main objects of the present invention to provide a vertically stable aerial platform that is elevated to predetermined altitudes.

It is another object of this invention to provide a vertically stable aerial platform for harnessing wind energy at predetermined altitudes with wind turbine assemblies.

It is another object of this invention to provide a vertically stable aerial platform for elevating camera equipment to predetermined altitudes.

It is another object of this invention to provide a vertically stable aerial platform for elevating communication system antennas to predetermined altitudes.

It is another object of this invention to provide a vertically stable aerial platform for elevating equipment to predetermined altitudes.

It is another object of this invention to provide a vertically stable aerial platform that is able to launch and stay aloft in minimal wind speed conditions.

It is another object of this invention to provide a vertically stable aerial platform that stays vertically oriented directly above its respective launch site.

It is another object of this invention to provide a vertically stable aerial platform comprising pitching means to maintain a predetermined pitch about a lateral axis.

It is another object of this invention to provide a vertically stable aerial platform comprising anti-rolling means to minimize rolling about a longitudinal axis.

It is another object of this invention to provide a vertically stable aerial platform comprising anti-yawing means to minimize yawing about a vertical axis.

It is another object of this invention to provide a vertically stable aerial platform that is tethered to a ground station.

It is another object of this invention to provide a vertically stable aerial platform comprising an electrically conducted tether.

It is another object of this invention to provide a vertically stable aerial platform that maintains vertically oriented with little deviation from its respective launch site, consequently requiring less space to launch while permitting a plurality to be positioned near each other.

It is another object of this invention to provide a vertically stable aerial platform costing significantly less than traditional ground-based wind turbines.

It is another object of this invention to provide a vertically stable aerial platform that is volumetrically efficient.

It is another object of this invention to provide a vertically stable aerial platform that is of a durable and reliable construction.

It is yet another object of this invention to provide such a vertically stable aerial platform that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
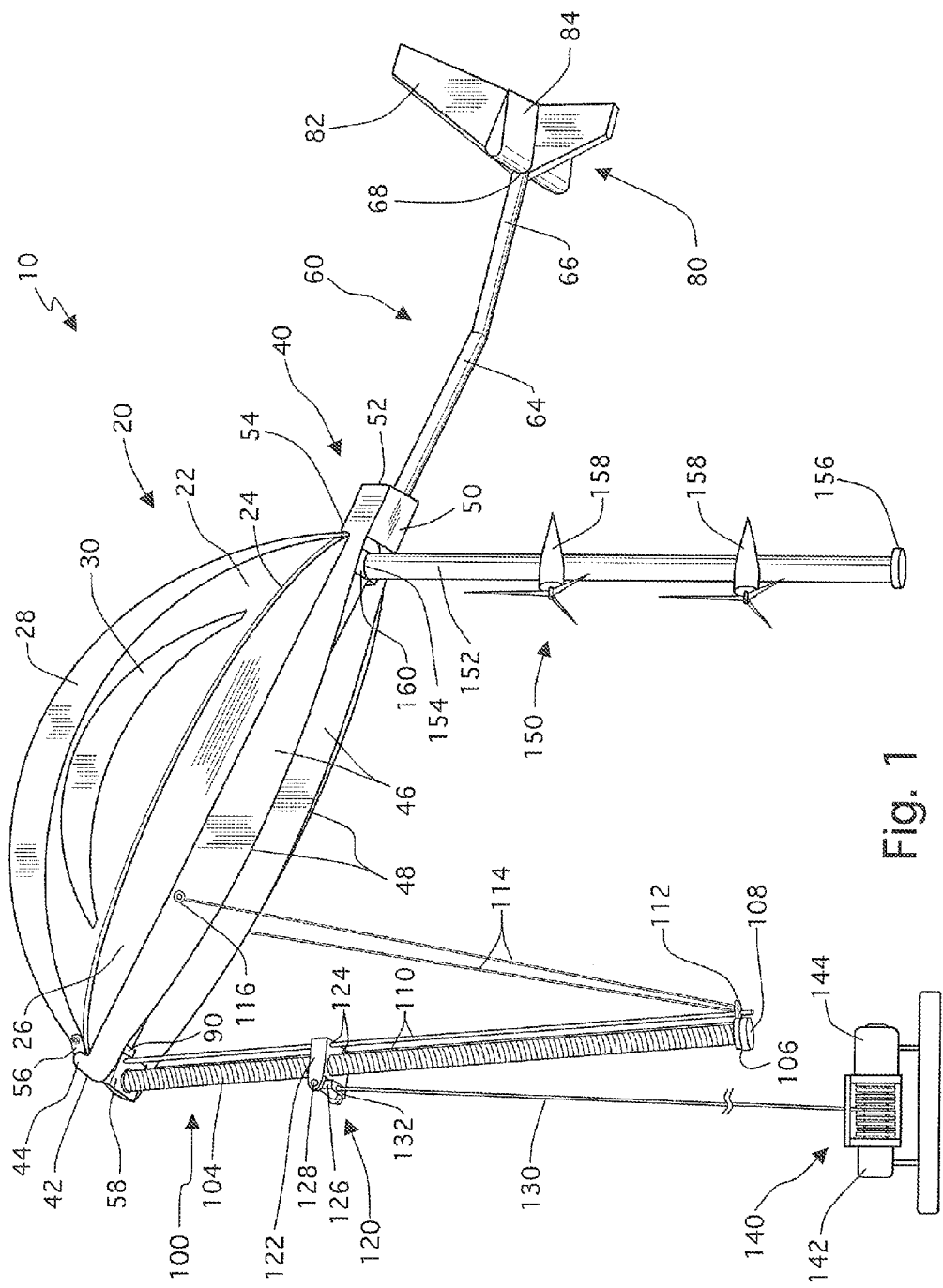
FIG. 1 is an isometric view of a preferred embodiment of the present invention.

Referring now to the drawings, the present invention is a vertically stable aerial platform and is generally referred to with numeral 10. It can be observed that it basically includes envelope assembly 20, base frame assembly 40, tail assembly 80, adjusting strut assembly 100, adjusting strut nut assembly 120, ground station 140, and wind turbine assembly 150.

Figure 2:
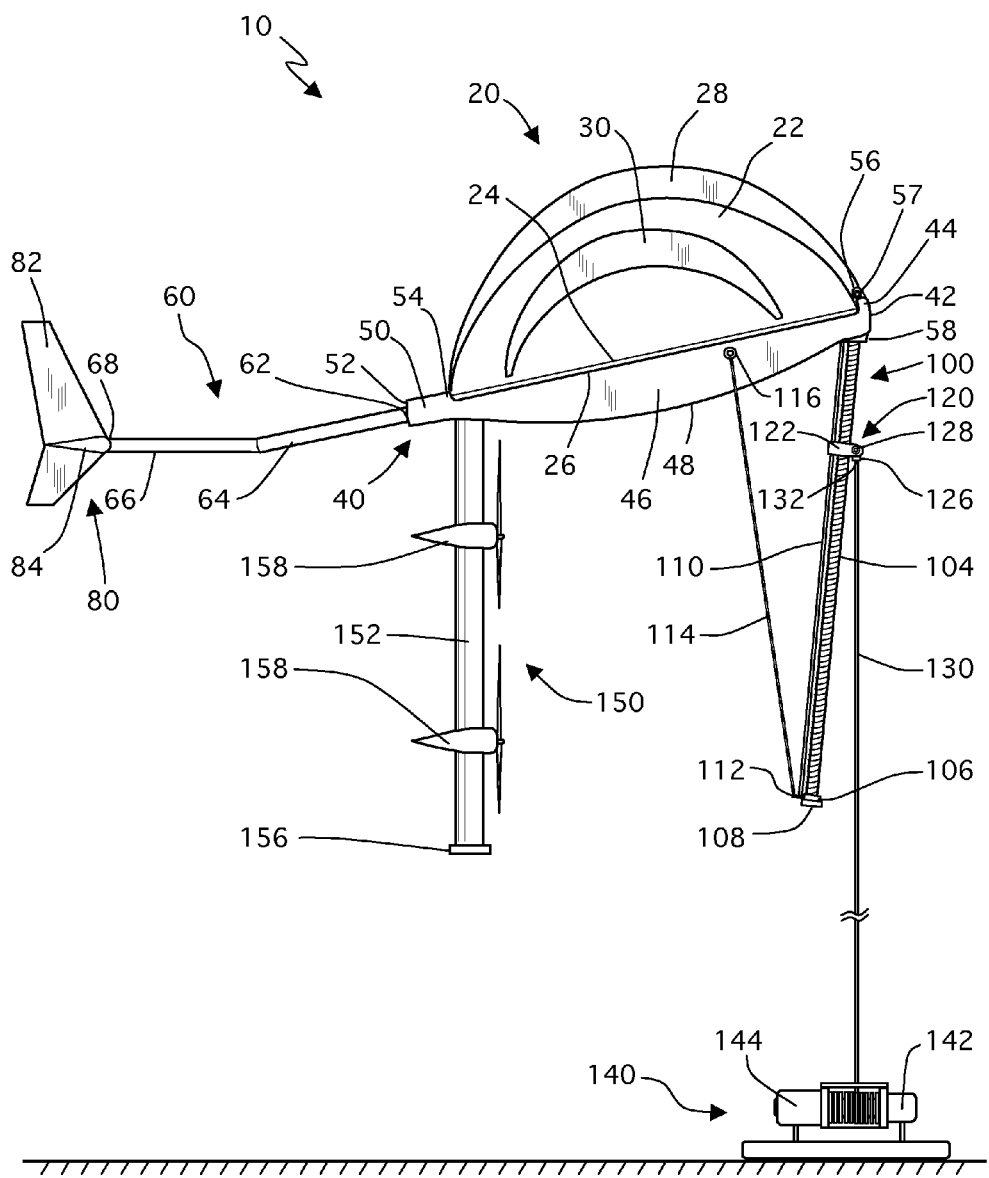
FIG. 2 is a side elevational view of the preferred embodiment of the present invention.
Figure 3:
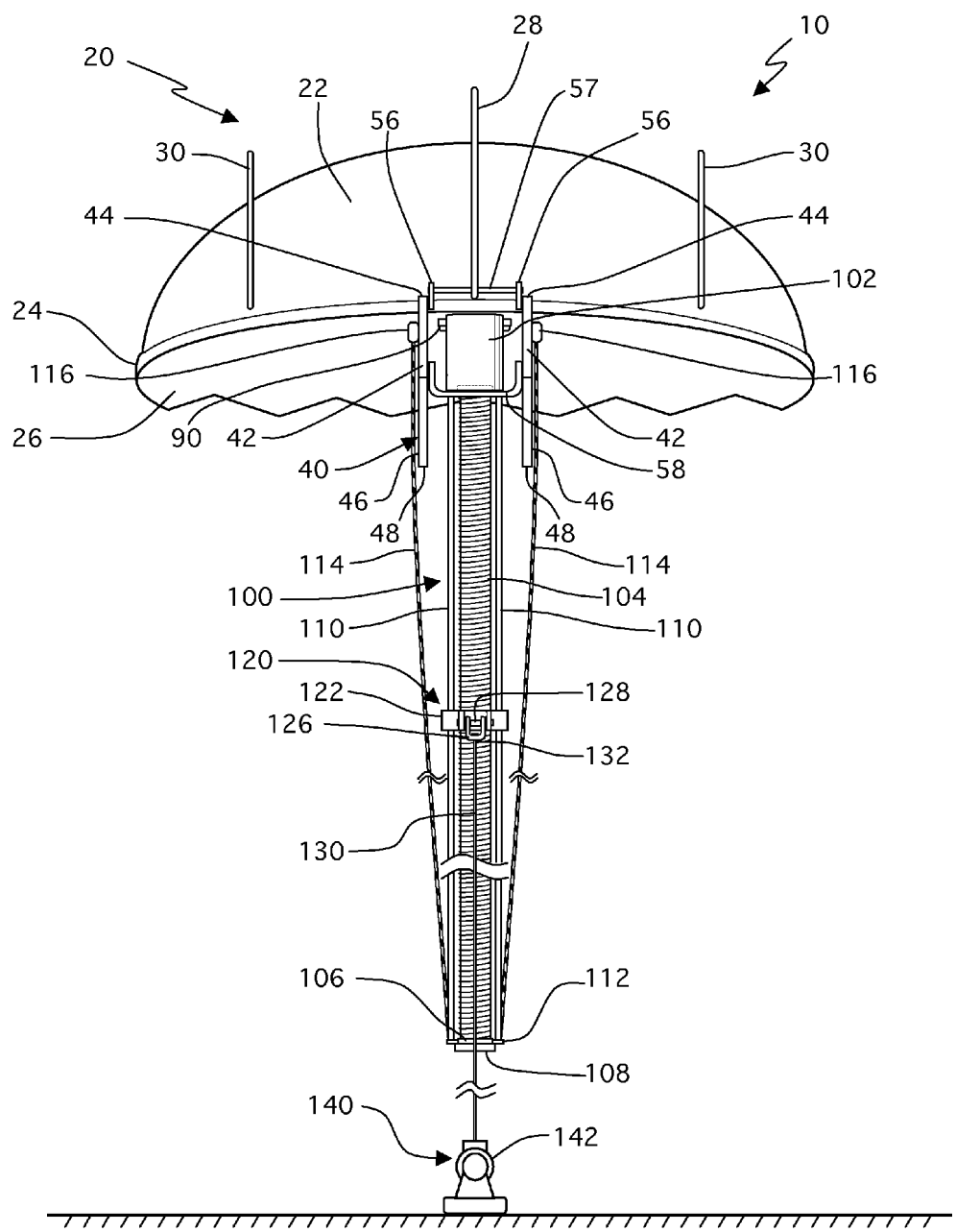
FIG. 3 is a front partial view of the preferred embodiment of the present invention.

As seen in FIGS. 1, 2, and 3, envelope assembly 20 comprises envelope 22 having edge 24 and base 26. In a preferred embodiment, envelope 22 is an aerodynamically shaped inflatable housing filled with lighter-than-air gas, whereby envelope 22 is substantially convex and base 26 is substantially flat. The lighter-than-air gas may be helium, or other gas, or combination of gases, having similar characteristics. The lighter-than-air gas within envelope 22 provides lift for vertically stable aerial platform 10. Envelope assembly 20 is mounted onto base frame assembly 40, whereby base frame assembly 40 comprises sidewalls 46, which extend longitudinally, and substantially parallel, from a front end to a rear end of edge 24. Sidewalls 46 have respective forward edges 42 and respective bottom edges 48, and terminate at rear wall 52. Forward lip sections 44 extend upwardly from forward edges 42, partially overcoming the front end of edge 24. Similarly, rear lip sections 54 extend upwardly from housing 50, partially overcoming the rear end of edge 24. Housing 50 is defined between rear lip sections 54 and rear wall 52.

Present invention 10 further comprises anti-rolling means to minimize rolling about a longitudinal axis, whereby in a preferred embodiment, central vertical stabilizer 28 and at least two lateral vertical stabilizers 30 protrude vertically from envelope 22 and away from base 26. For reference, the longitudinal axis of present invention 10 generally extends from forward edges 42 to a rear edge of tail assembly 80 as best seen in FIGS. 1 and 2.

Present invention 10 further comprises pitching means to maintain a predetermined pitch about a lateral axis, whereby in a preferred embodiment, adjusting strut assembly 100 and adjusting strut nut assembly 120 maintain the predetermined pitch for present invention 10. For reference, the lateral axis of present invention 10 generally extends from one side of edge 24 to its opposite side perpendicularly across central vertical stabilizer 28 as best seen in FIG. 3.

Adjusting strut assembly 100 is mounted to adjusting strut bracket 58, and comprises motor 102, stabilizing bars 110, and cables 114. Extending from motor 102 is jackscrew 104, whereby motor 102 provides bi-directional rotational forces to jackscrew 104. A bottom end of jackscrew 104 is mounted to base 108 having bearing 106. Extending from bearing 106 is stabilizing bars bracket 112. Stabilizing bars 110 are at a parallel disposition with respect to jackscrew 104. Lower ends of stabilizing bars 110 and cables 114 are fixed to stabilizing bars bracket 112. Upper ends of cables 114 are fixed to attachment points 116. Attachment points 116 are positioned at exterior sides of respective sidewalls 46, each at a predetermined distance from forward edges 42.

Adjusting strut nut assembly 120 is mounted onto jackscrew 104, and comprises strut nut 122, anchor bracket 126, and electrically conducted tether 130 having end 132. Strut nut 122 has holes 124 that receive stabilizing bars 110 therethrough. Anchor bracket 126 is mounted to strut nut 122 with pin 128. End 132 is fixed to anchor bracket 126. Electrically conducted tether 130 extends to ground station 140. Ground station 140 comprises winch assembly 142 and electrical system 144. Upper end 132 of electrically conducted tether 130 is secured to anchor bracket 126, while its lower end engages winch assembly 142 of ground station 140.

Wind turbine assembly 150 is mounted to bracket 160 positioned between sidewalls 46. Wind turbine assembly 150 comprises mounting post 152 with upper end 154, and base 156. Wind turbine assembly 150 further comprises at least a pair of wind turbines 158. Wind turbines 158 are mounted to mounting post 152, spaced apart from each other and from upper end 154 and base 156. Wind turbines 158 are counter-rotating to neutralize torque force. Wind turbines 158 convert wind energy into electric energy that is captured and sent through internal wiring to electrical system 144 of ground station 140 via electrically conducted tether 130.

Extending from base frame assembly 40 is tail assembly connecting bar 60. Tail assembly connecting bar 60 comprises connecting bars 64 and 66. Connecting bar 64 has forward end 62 and connecting bar 66 has rear end 68. Forward end 62 is fixedly mounted to housing 50. Connecting bar 64 is aligned with base 26 and base frame assembly 40. Connecting bar 66, however, is at an angle with respect to connecting bar 64. In a preferred embodiment connecting bar 66 is in a horizontal position while present invention 10 is aloft.

Present invention 10 further comprises anti-yawing means to minimize yawing about a vertical axis, whereby in a preferred embodiment, tail assembly 80 extends from tail assembly connecting bar 60. For reference, the vertical axis of present invention 10 generally extends from a top edge of central vertical stabilizer 28 vertically through base 26.

Tail assembly 80 comprises vertical fin 82 and horizontal stabilizers 84. Horizontal stabilizers 84 align with connecting bar 66, and therefore are kept in a fixed horizontal orientation. Tail assembly 80 is designed to maximize efficiency and keep wind turbines 158 properly oriented. Vertical fin 82 keeps wind turbines 158 oriented into the wind for directional stability. The fixed horizontal orientation of horizontal stabilizers 84, created by the angle of connecting bar 64, assists to keep central vertical stabilizer 28, lateral vertical stabilizers 30, and wind turbines 158 at an optimal pitch/angle.

As best seen in FIG. 3, base frame assembly 40 comprises adjusting strut bracket 58 mounted to interior sections of sidewalls 46 adjacent to forward edges 42. Base frame assembly 40 further comprises tabs 56 and pin 57. Tabs 56 are fixed to an interior side of forward lip sections 44. Tabs 56 receive pin 57, whereby pin 57 passes through a front end of central vertical stabilizer 28.

Pitching means of present invention 10 further comprises accelerometer 90 and supporting hardware, wiring, and software including, but not limited to a single-board microcontroller such as a programmed Arduino chip to calculate the pitch of present invention 10 and cause motor 102 to turn jackscrew 104 clockwise or counter clockwise to maintain an optimal predetermined pitch for present invention 10. As an example of the pitching means in operation, in minimal wind speed conditions, jackscrew 104 turns until strut nut assembly 120 is at a bottom of jackscrew 104, moving a center of lift rearward towards tail assembly 80. As the wind speed conditions increase, jackscrew 104 turns, raising strut nut assembly 120 upon jackscrew 104, subsequently moving the center of lift forward towards jackscrew 104 and maintaining the optimal predetermined pitch for present invention 10. The pitching means enables present invention 10 to launch and stay aloft in minimal wind speed conditions, and remain vertically oriented directly above its respective launch site regardless of changes in the force or direction of the wind.

When present invention 10 is utilized for harnessing wind energy at predetermined altitudes with wind turbines 158, electrically conducted tether 130 transfers electricity generated by wind turbines 158 to ground station 140. Electrically conducted tether 130 is electrically conductive and strong enough to anchor present invention 10. Electrically conducted tether 130 is wound onto winch assembly 142 to raise or lower present invention 10 to a desired predetermined altitude having with ideal wind conditions at any given time.

Present invention 10 may also be utilized for elevating camera equipment, communication system antennas, and/or equipment in general to predetermined altitudes.

Figure 4:
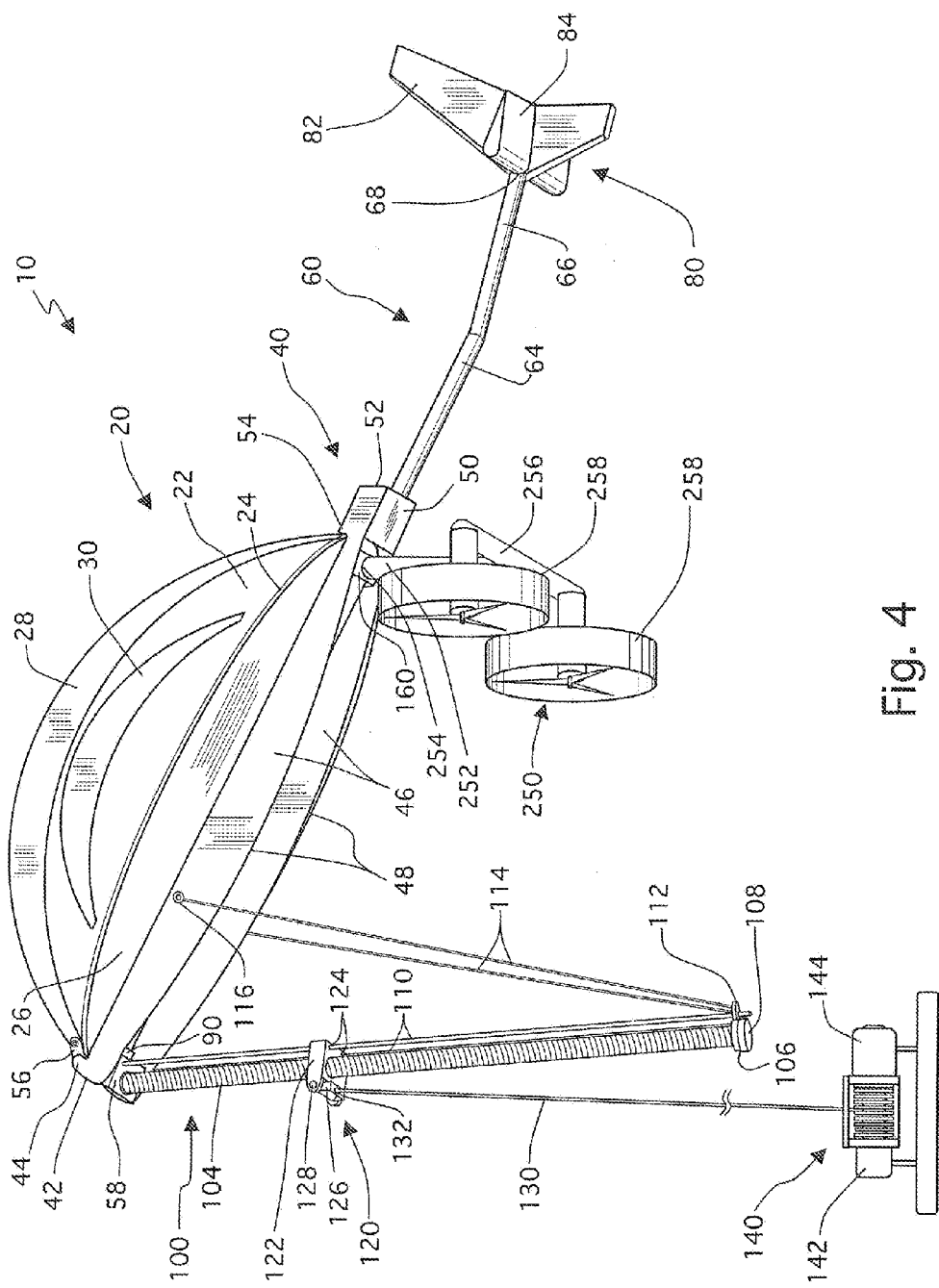
FIG. 4 is an isometric view of a first alternate embodiment of the present invention.
Figure 5:
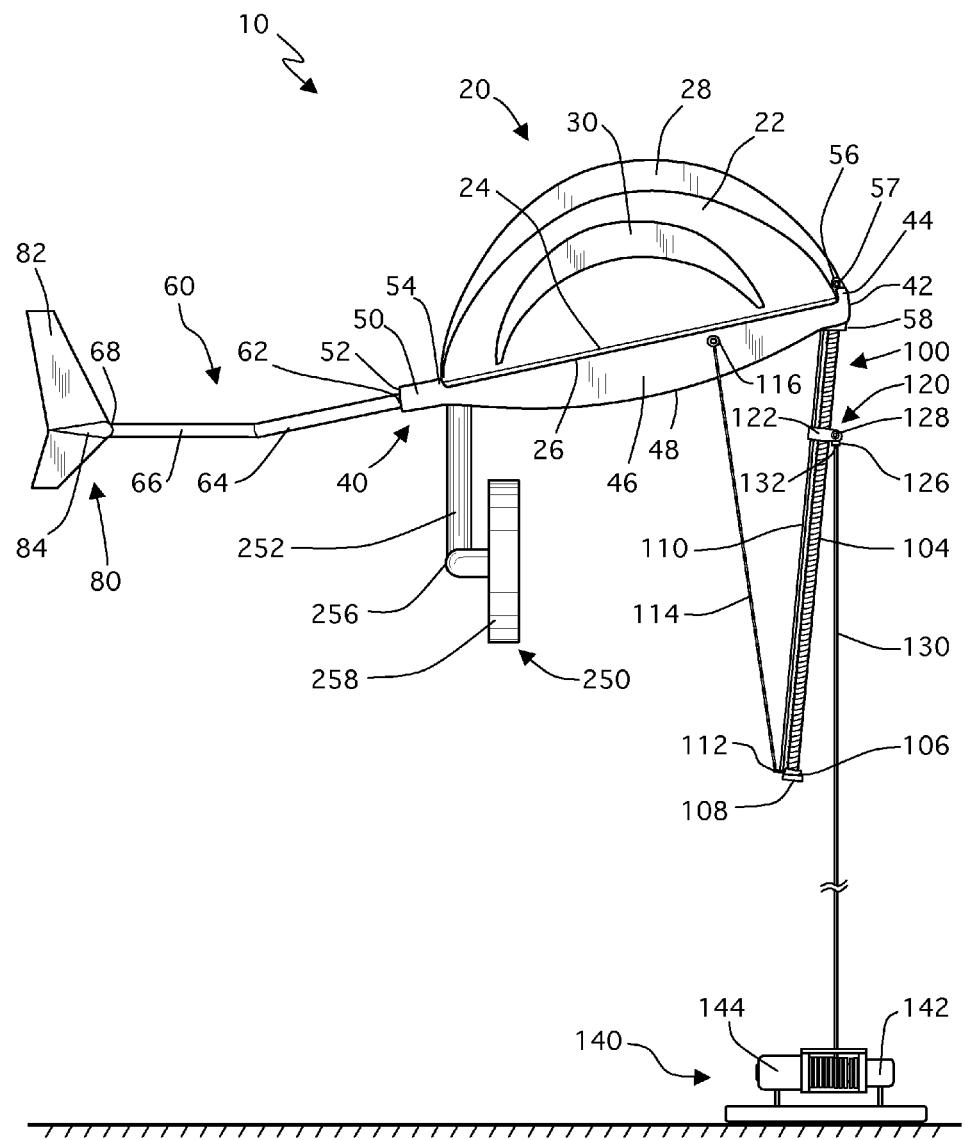
FIG. 5 is a side elevational view of the first alternate embodiment of the present invention.

Seen in FIGS. 4 and 5 is an alternate embodiment for wind turbine assembly 150. Wind turbine assembly 250 is mounted to bracket 160 positioned between sidewalls 46. Wind turbine assembly 250 comprises mounting post 252 with upper end 254, and transversal post 256. Wind turbine assembly 250 further comprises at least a pair of wind turbines 258. Wind turbines 258 are mounted to transversal post 256. Wind turbines 258 are counter-rotating to neutralize torque force. Like wind turbine assembly 150, wind turbines 258 convert wind energy into electric energy that is captured and sent through internal wiring to electrical system 144 of ground station 140 via electrically conducted tether 130.

Figure 6:
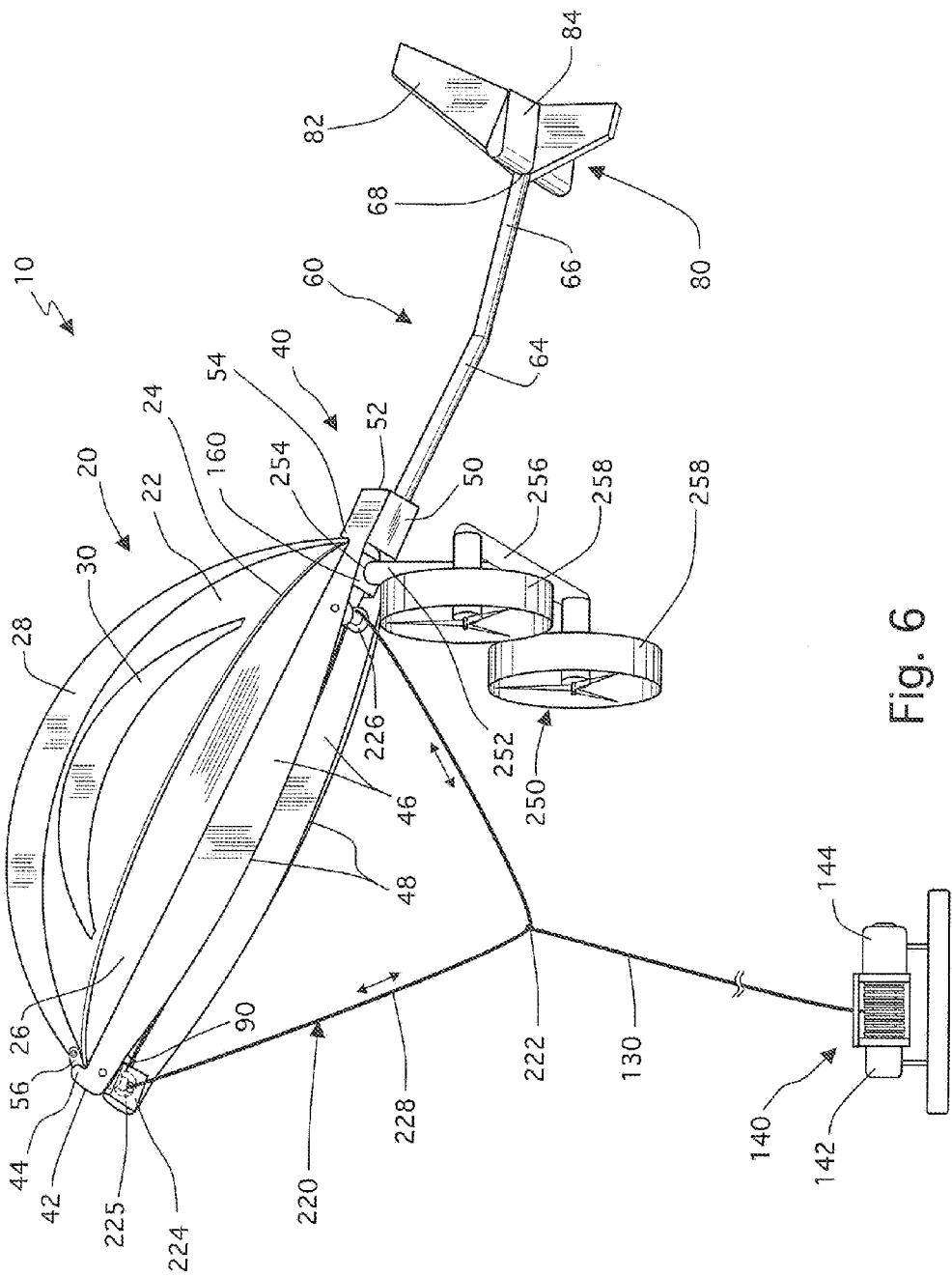
FIG. 6 is an isometric view of a second alternate embodiment of the present invention.

As seen in FIG. 6, in an alternate embodiment, present invention 10 further comprises pitching means to maintain a predetermined pitch about a lateral axis, whereby adjusting cable assembly 220 maintains the predetermined pitch for present invention 10. Adjusting cable assembly 220 comprises cable motor 224 having pulley 225, pulley 226, and adjusting cable 228. It is noted that in this embodiment, electrically conducted tether 130 is fixed and stationary at point 222.

Pitching means in the alternate embodiment of present invention 10 further comprises accelerometer 90 and supporting hardware, wiring, and software including, but not limited to a single-board microcontroller such as a programmed Arduino chip to calculate the pitch of present invention 10 and cause cable motor 224 to adjust adjusting cable 228 to maintain an optimal predetermined pitch for present invention 10. As an example of the pitching means in operation, in minimal wind speed conditions, cable motor 224 adjusts adjusting cable 228 moving the center of lift rearward, whereby point 222 shifts towards tail assembly 80. As the wind speed conditions increase, cable motor 224 adjusts adjusting cable 228, subsequently moving the center of lift forward away from tail assembly 80 and maintaining the optimal predetermined pitch for present invention 10. The pitching means enables present invention 10 to launch and stay aloft in minimal wind speed conditions, and remain vertically oriented directly above its respective launch site regardless of changes in the force or direction of the wind.

Present invention 10 therefore combines lifting forces of a balloon/blimp and the lifting forces of a kite/wing. This combination design is often referred to as a "Kytoon" or "Kit Balloon". However, present invention 10 is able to launch and stay aloft in low wind conditions, while remaining vertically oriented directly above the launch site. Present invention 10 captures predetermined altitude wind energy over a localized area and across varied wind speeds.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An aerial platform, comprising:
   A) an envelope assembly comprising an envelope having an edge and a base, said envelope is an aerodynamically shaped inflatable housing filled with lighter-than-air gas, whereby said envelope is substantially convex and said base is substantially flat, said lighter-than-air gas within said envelope provides lift;
   B) a base frame assembly;
   C) a tail assembly;
   D) a ground station; and
   E) anti-rolling means to minimize rolling about a longitudinal axis, whereby a central vertical stabilizer and at least two lateral vertical stabilizers protrude vertically from said envelope and away from said base.

2. The aerial platform set forth in claim 1, further characterized in that said lighter-than-air gas is helium.

3. The aerial platform set forth in claim 1, further comprising a mounting post to mount a wind turbine assembly thereon.

4. The aerial platform set forth in claim 1, further comprising a mounting post to mount camera equipment, communication system antennas, and/or equipment thereon.

5. The aerial platform set forth in claim 1, further characterized in that said envelope assembly is mounted onto said base frame assembly, whereby said base frame assembly comprises first and second sidewalls that extend longitudinally from a front end to a rear end of said edge, said first and second sidewalls have respective forward edges and respective bottom edges, and terminate at a rear wall.

6. The aerial platform set forth in claim 5, further characterized in that said base frame assembly further comprises forward lip sections that extend from said respective forward edges, partially overcoming said front end of said edge.

7. The aerial platform set forth in claim 5, further characterized in that said base frame assembly further comprises rear lip sections that extend from a housing, partially overcoming said rear end of said edge, whereby said housing is defined between said rear lip sections and said rear wall.

8. The aerial platform set forth in claim 1, further characterized in that extending from said base frame assembly is a tail assembly connecting bar.

9. The aerial platform set forth in claim 8, further characterized in that said tail assembly connecting bar comprises first and second connecting bars, said first connecting bar is fixedly mounted to said housing and is aligned with said base and said base frame assembly.

10. The aerial platform set forth in claim 9, further characterized in that said second connecting bar is at an angle with respect to said first connecting bar.

11. The aerial platform set forth in claim 9, further characterized in that said second connecting bar is in a horizontal position while said aerial platform is aloft.

12. The aerial platform set forth in claim 9, further comprising anti-yawing means to minimize yawing about a vertical axis, whereby said tail assembly extends from said second connecting bar.

13. The aerial platform set forth in claim 9, further characterized in that said tail assembly comprises a vertical fin and horizontal stabilizers, said horizontal stabilizers align with said second connecting bar and therefore are kept in a fixed horizontal orientation.

14. The aerial platform set forth in claim 13, further characterized in that said horizontal orientation of said horizontal stabilizers assist to keep said central vertical stabilizer and said at least two lateral vertical stabilizers at an optimal pitch/angle.

15. The aerial platform set forth in claim 1, further comprising pitching means to maintain a predetermined pitch about a lateral axis, whereby said pitching means comprises an accelerometer to calculate pitch of said aerial platform and cause to maintain an optimal predetermined pitch.

16. The aerial platform set forth in claim 15, further characterized in that said pitching means enables said aerial platform to launch and stay aloft in minimal wind speed conditions, and remain vertically oriented generally above its respective launch site regardless of changes in force or direction of wind.

17. The aerial platform set forth in claim 1, further characterized in that said ground station comprises a winch assembly, an electrical system, and an electrically conducted tether.

18. The aerial platform set forth in claim 17, further characterized in that said electrically conducted tether is wound onto said winch assembly to raise or lower said aerial platform to a desired predetermined altitude having ideal wind conditions at any given time.

* * * * *